(12) United States Patent
Schuh et al.

(10) Patent No.: US 6,719,378 B2
(45) Date of Patent: Apr. 13, 2004

(54) BRAKE SYSTEM FOR A VEHICLE

(75) Inventors: Juergen Schuh, Markgroeningen (DE); Manfred Gerdes, Oberrixingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/017,239

(22) Filed: Dec. 13, 2001

(65) Prior Publication Data

US 2002/0125765 A1 Sep. 12, 2002

(30) Foreign Application Priority Data

Dec. 15, 2000 (DE) .......................... 100 62 546

(51) Int. Cl.[7] ................................ B60T 8/00
(52) U.S. Cl. ...................................... 303/146
(58) Field of Search .................. 303/10, 11, 113.2, 303/113.4, 113.5, 116.2, 139, 140, 146

(56) References Cited

U.S. PATENT DOCUMENTS 5,816,667 A * 10/1998 Jokic ...................... 303/113.4
5,862,503 A * 1/1999 Eckert et al. ................. 701/78
6,254,198 B1 * 7/2001 Zittlau ..................... 303/113.4
6,273,525 B1 * 8/2001 Erban et al. .................. 303/11

FOREIGN PATENT DOCUMENTS

| DE | 197 12 889 | 10/1998 |
| WO | WO 98/43860 | 10/1998 |

\* cited by examiner

Primary Examiner—Christopher P. Schwartz
(74) Attorney, Agent, or Firm—Kenyon & Kenyon (57) ABSTRACT

A brake system for a vehicle, as well as a method for operating the brake system for a vehicle, a braking pressure that is dependent upon a correction factor being adjusted by the brake system, the correction factor being produced by a characteristic curve which is between the correction factor and the transversal acceleration of the vehicle and which has a range including an ascent that is dependent upon the transversal acceleration of the vehicle.

26 Claims, 6 Drawing Sheets

BRAKE SYSTEM FOR A VEHICLE

FIELD OF THE INVENTION

The present invention is directed to a brake system for a vehicle, as well as to a method for operating a brake system, a braking pressure that is dependent upon a correction factor being adjusted by the brake system, the correction factor being produced by a characteristic curve between the correction factor and the transversal acceleration of the vehicle.

BACKGROUND INFORMATION

In response to a vehicle's transversal accelerations, it can happen, in the vehicle's brake system, that the pistons of wheel-brake cylinders are pushed into these cylinders (so-called variation in the air gap). To push the pistons out of the wheel-brake cylinders again, a brake medium must be pressed into the wheel-brake cylinders. This degrades the braking performance. To lessen this influence that degrades the braking response, German Patent DE 197 12 889 describes a method for correcting the braking pressure.

The object of the present invention is to improve a vehicle's braking performance.

SUMMARY

This objective is achieved in accordance with the present invention by a method pursuant to Claim 1 and Claim 2, as well as by a brake system pursuant to Claims 8 and 9, and by a control unit for a brake system pursuant to Claim 10. In this context, a braking pressure that is dependent upon a correction factor is adjusted by the brake system, the correction factor being generated by a characteristic curve having a substantially continuous, first derivative between the correction factor and the transversal acceleration of the vehicle, and/or the correction factor being generated by a characteristic curve which is between the correction factor and the transversal acceleration of the vehicle and whose range includes an ascent that is dependent upon the vehicle's transversal acceleration.

A vehicle brake system in accordance with the present invention, which is able to adjust a braking pressure that is dependent upon a correction factor, has a memory including a characteristic curve between the correction factor and the transversal acceleration of the vehicle, the first derivative of the characteristic curve between the correction factor and the transversal acceleration of the vehicle being, in particular, substantially continuous, and/or the characteristic curve which is between the correction factor and the transversal acceleration of the vehicle having at least one range that includes an ascent that is dependent upon the vehicle's transversal acceleration.

A control unit for the brake system of a vehicle in accordance with the present invention for generating manipulated variables, which are dependent upon a correction factor, for the brake system to adjust a braking pressure, has a memory including a characteristic curve between the correction factor and the transversal acceleration of the vehicle, the first derivative of the characteristic curve between the correction factor and the transversal acceleration of the vehicle being, in particular, substantially continuous, and/or the characteristic curve which is between the correction factor and the transversal acceleration of the vehicle having at least one range that includes an ascent that is dependent upon the vehicle's transversal acceleration.

In an advantageous embodiment of the present invention, the characteristic curve has at least one first range and/or at least one second range including a correction factor that is independent of the vehicle's transversal acceleration.

In another advantageous embodiment of the present invention, the characteristic curve between the first range and the second range has a third range having a correction factor that is, in particular, linearly dependent upon the vehicle's transversal acceleration.

In another advantageous embodiment of the present invention, the characteristic curve has a range between the first range and the third range that includes an ascent that is dependent upon the vehicle's transversal acceleration, the correction factor advantageously being dependent upon the square of the vehicle's transversal acceleration.

In yet another advantageous embodiment of the present invention, the characteristic curve has a range between the range and the third range that includes an ascent that is dependent upon the vehicle's transversal acceleration, the correction factor advantageously being dependent upon the square of the vehicle's transversal acceleration.

One exemplarily embodiment of the present invention provides a filter for filtering a measured value of a vehicle's transversal acceleration. In accordance with this embodiment, a filtered value for the transversal acceleration is the input value for characteristic curve designated above.

BRIEF DESCRIPTION OF THE DRAWINGS

Further advantages and details are derived from the following description of exemplary embodiments. The individual figures show.

DETAILED DESCRIPTION

Figure 1:
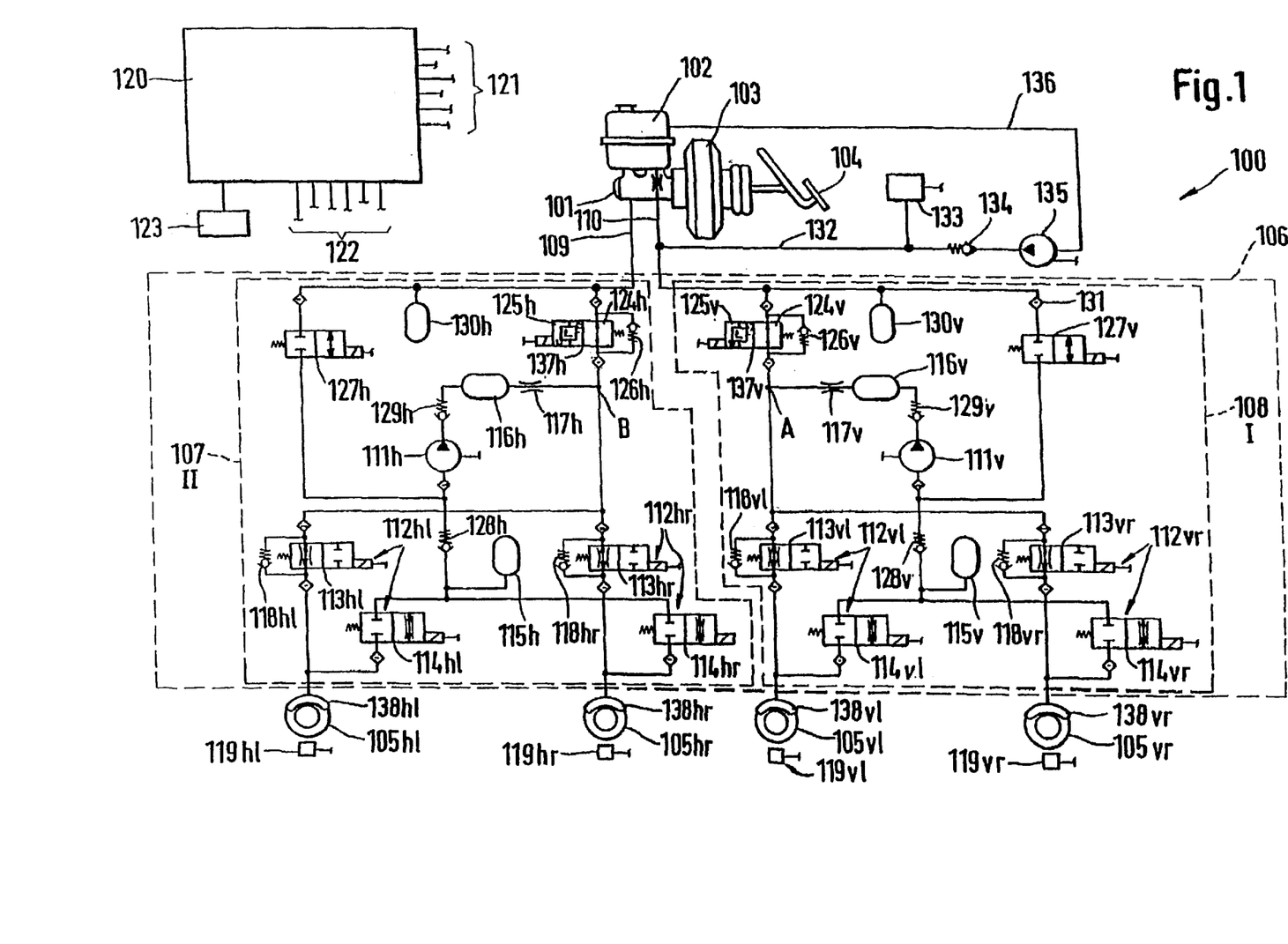
FIG. 1 a vehicle brake system.

FIG. 1 shows a vehicle brake system 100, as described in German Patent DE 197 12 889. Brake system 100 has a dual-circuit master brake cylinder 101 having a reservoir 102, including, for example, a pneumatic power brake unit 103 and a brake pedal 104, as well as two brake circuits 107 and 108, respectively. Assigned to brake circuit 107 are both wheels 105$hl$ and 105$hr$, respectively, together with corresponding actuators 138$hl$ and 138$hr$, respectively. Assigned to brake circuit 108 are both wheels 105$vl$ and 105$vr$, respectively, together with corresponding actuators 138$vl$ and 138$vr$, respectively. Configured between master brake cylinder 101 and actuators 138$hlr$, 138$hlr$, 138$vl$, and 138$vr$, respectively, is a wheel-slip control device 106, which is also designated as a hydraulic unit. The actuators are wheel brakes known from the related art, which are operable via a brake medium which may be fed into the corresponding wheel-brake cylinders.

The simplified notation 105$ij$ is introduced in the following for the wheels of the vehicle. In this context, index i indicates whether the wheel is located at rear axle (h) or at front axle (v). Index j indicates the allocation to right (r) and/or to left (l) vehicle side. This designation by the two indices i and j, respectively, is for all variables and/or components where they have a use, corresponding, for example, to actuators 138$ij$ and the valves and/or pumps, respectively, contained in the brake system.

The brake-circuit configuration shown in FIG. 1 is a so-called front/rear split. This brake-circuit configuration includes a first brake circuit I, which is denoted by 108 and to which the vehicle's front wheels 015*vj* are assigned. In addition, the brake-circuit configuration includes a second brake circuit II, which is denoted by 107 and to which the vehicle's rear wheels 105*hj* are assigned. It is not intended for this brake-circuit configuration to constitute any restriction. It is also conceivable to employ the method of the present invention and the device of the present invention, respectively, in a brake system having a different brake-circuit configuration.

Master brake cylinder 101 is constructed, for example, in generally known fashion and is operable with the aid of brake pedal 104, so that braking pressures arise in brake circuits 107 and 108. The action exercisable by brake pedal 104 on master brake cylinder 101 may be amplified by brake booster 103. Reservoir 102 supplies master brake cylinder 101 with pressurized media, which is able to be pushed out by master brake cylinder 101 in the direction of actuators 138*ij*, through hydraulic unit 106, for a normal braking operation.

Hydraulic unit 106 is designed as a so-called return-flow type in order to influence wheel slip in response to actuation of brake pedal 104, and has a return pump 111*h* for brake circuit 107 and a return pump 111*v* for brake circuit 108. In addition, for each of actuators 138*ij*, hydraulic unit 106 has a separate brake-pressure modulation valve arrangement 112*ij*, made up, for example, of an intake valve 113*ij* and of an exhaust valve 114*ij*, as well as an accumulator chamber 115*i* for each brake circuit 107 and 108. Also provided are, for example, a first damping chamber 116*h* for brake circuit 107 and a second damping chamber 116*v* for brake circuit 108, as well as a damping orifice 117*h* and 117*v*, respectively. The motor required for driving return pumps 111*i* is not shown in FIG. 1. At this point, it should be noted that it is also conceivable for each of return pumps 111*i* to be provided with a separate motor. Also, return pumps 111*i* may have different structural designs. On the one hand, it is conceivable for the two return pumps to be configured so as to be structurally separate from one another. On the other hand, it is conceivable for return pumps 111*i* to have a contiguous physical design, thereby resulting, in the broader sense, in one pump made up of two "pump elements" 111*i*.

Starting from actuators 138*ij*, their respectively assigned intake valves 113*ij* may be circumvented in the direction of master brake cylinder 101 by check valves 118*ij*, which are able to open in the direction of master brake cylinder 101 in response to a pressure drop across intake valve 113*ij* in question, for example, when this valve is controlled into its blocking position or when, in its normal open position, an assigned throttle is active.

When brake pedal 104 is actuated and, therefore, the braking pressure is supplied to actuators 138*ij*, wheel slip control operation is possible using the mentioned individual elements of hydraulic unit 106. For this, intake valves 113*ij* between actuators 138*ij* in question and master brake cylinder 101 are normally in the open position, so that pressure generated by actuation of brake pedal 104 in master brake cylinder 101 may normally arrive in actuators 138*ij*. Exhaust valves 114*ij*, belonging to brake-pressure modulation valve arrangements 112*ij* and likewise coupled to actuators 138*ij*, are closed in the normal position and, in the controlled position, render possible a throttling passage, and are coupled on the inlet side to return pump 111*h* of brake circuit 107 and, on the inlet side, to return pump 111*v* of brake circuit 108, respectively. On the outlet side, dampers 116*i* join up with return pumps 111*i*. Throttles 117*i* follow damping chambers 116*i* in the direction of master brake cylinder 101, as well as of intake valves 113*i* in question.

Hydraulic unit 106 has a control unit 120 as well as wheel-speed sensors 119*ij* assigned to wheels 105*ij*. Signals $n_{ij}$, generated by wheel-speed sensors 119*ij*, are fed to control unit 120. This is indicated in FIG. 1 by electric lines outgoing from wheel-speed sensors 119*ij*, as well as by connections 122 at the control unit, which are intended to represent the signals fed to the control unit. Further sensors connected to control unit 120 are indicated by block 123. The already described pumps and/or valves, as well as further pumps and/or valves still to be described, are connected to control unit 120. This is indicated by connections 121, which are intended to represent drive signals outgoing from control unit 120, and by electric lines located at the valves and/or pumps.

Control unit 120 may be employed, for example, for controlling brake slip, and/or for controlling traction slip, and/or for controlling a variable describing the driving dynamics of the vehicle, in particular the yaw rate of the vehicle.

If, for example, an increasing brake slip involving an imminent wheel lock tendency is ascertained for all wheels in control unit 120, control unit 120 switches on return pumps 111*i*, closes all intake valves 113*ij*, and opens all assigned exhaust valves 114*ij*. This has as a consequence that pressure, possibly still rising in master brake cylinder 101, does not attain actuators 138*ij*, but rather that brake medium may flow off from these actuators 138*ij* into accumulator chambers 115*i*, thereby reducing or eliminating the danger of wheel lock. The brake medium the flows out of accumulator chambers 115*i* into return pumps 111*i*. Consequently, these return pumps 111*i* force the brake medium through damping chambers 116*i* and throttles 117*i* via the two switch-over valves 137*i*, back to master brake cylinder 101. As a result, the pressure existing in the wheel brake cylinder is reduced by return pump 111*i*. Once there is no longer a danger of wheel lock, the assumption being here that this danger disappears simultaneously at all wheels 105*ij*, brake-pressure modulation valve arrangements 112*ij* are forced into their basic positions, in that control unit 120 terminates the supplying of control currents necessary for reducing brake pressure. Control unit 120 likewise terminates the supplying of current to the two return pumps 111*i*.

Control unit 120 is also set up, for example, such that, in response to varying wheel lock danger at the wheels, pressures in actuators 138*ij* are able to be changed individually and independently of one another.

For automatic braking, hydraulic unit 106 has switch-over valves 137*i*, which, in a first position, function as a gate valve 124*i* and, in a second position, as a relief valve 125*i*. Configured in parallel to these switch-over valves 137*i* are check valves 126*i*. Check valves 126*i* ensure that admission pressure Pvor set by the driver is made available. In addition, precharging valves 127*i*, as well as check valves 128*i* are assigned on the inlet side to return pumps 111*i*. On the outlet side, the return pumps are each coupled to a further check valve 129*i*. Damping chambers 130*i* are provided in each instance between the ports of switch-over valves 137*i*, as well as precharging valves, which face master brake cylinder 101. To supply hydraulic unit 106 for purposes of automatic brake operation, at least one pump unit 135, in particular a precharging pump is provided, which is assigned to brake circuit 108. For this purpose, running from pump unit 135 to a master brake line 110, situated between master brake cylinder 101 and hydraulic unit 106, is a feed line 132, in which is installed a check valve 134 that opens toward master brake line 110. Pump unit 135 is coupled by a suction line 136 to reservoir 102. Provided between check valve 134 and master brake line 110 is a sensor 133, which generates a signal representing admission pressure Pvor set by the driver.

Second brake circuit 107 is connected via a master brake line 109, which is assigned thereto and is likewise situated between master brake cylinder 101 and hydraulic unit 106, to master brake cylinder 101.

If control unit 120 recognizes, for example, that automatic braking, i.e., a driver-independent pressure build-up, is necessary at least at one of front wheels 105$vj$, then control unit 120 turns on pump unit 135, with the result that return pump 111$v$ is supplied with brake medium through precharging valve 127$v$, which is simultaneously electrically opened by control unit 120, so that the pump, in response to a switching over of switch-over valve 137$v$ to the operation as relief valve 125$v$, provides pressure for the at least one actuator 138$vj$. Relief valve 125$v$ prevents a too vigorous pressure rise from occurring in brake circuit 108.

The procedure is similar when, with respect to rear wheels 105$hj$, a driver-independent pressure build-up is necessary. Here, however, there is no means available that is comparable to pump unit 135. In response to a displacement of the floating piston in master brake cylinder 101, return pump 111$h$ is supplied with brake medium in this brake circuit as well.

The procedure described in connection with the automatic braking corresponds to that which is carried out in a traction-slip control case to prevent spinning of the driven wheels.

In addition to the already described components, the hydraulic unit contains filters denoted at various locations by 131.

It is not intended that the described front/rear split of the brake system constitute any limitation; a diagonal split of the brake system would also be possible, for example. In addition, the described function of the brake system may also be implemented using other components, as well. Moreover, no restriction is intended by the representation of a hydraulic brake system. The use of the method of the present invention and/or of the device of the present invention would also be possible in connection with a pneumatic brake system.

By applying the method according to the present invention and/or by using the device according to the present invention, the brake-circuit pressure prevailing at location A may be ascertained for brake circuit 108, as may the brake-circuit pressure prevailing, for example, at location B, for brake circuit 107.

The already mentioned pressure build-up, carried out independently of the driver, is implemented as an active, i.e., partially active pressure build-up; in both case, the brake-circuit pressure is greater than brake pressure Pvor set by the driver.

Figure 2:
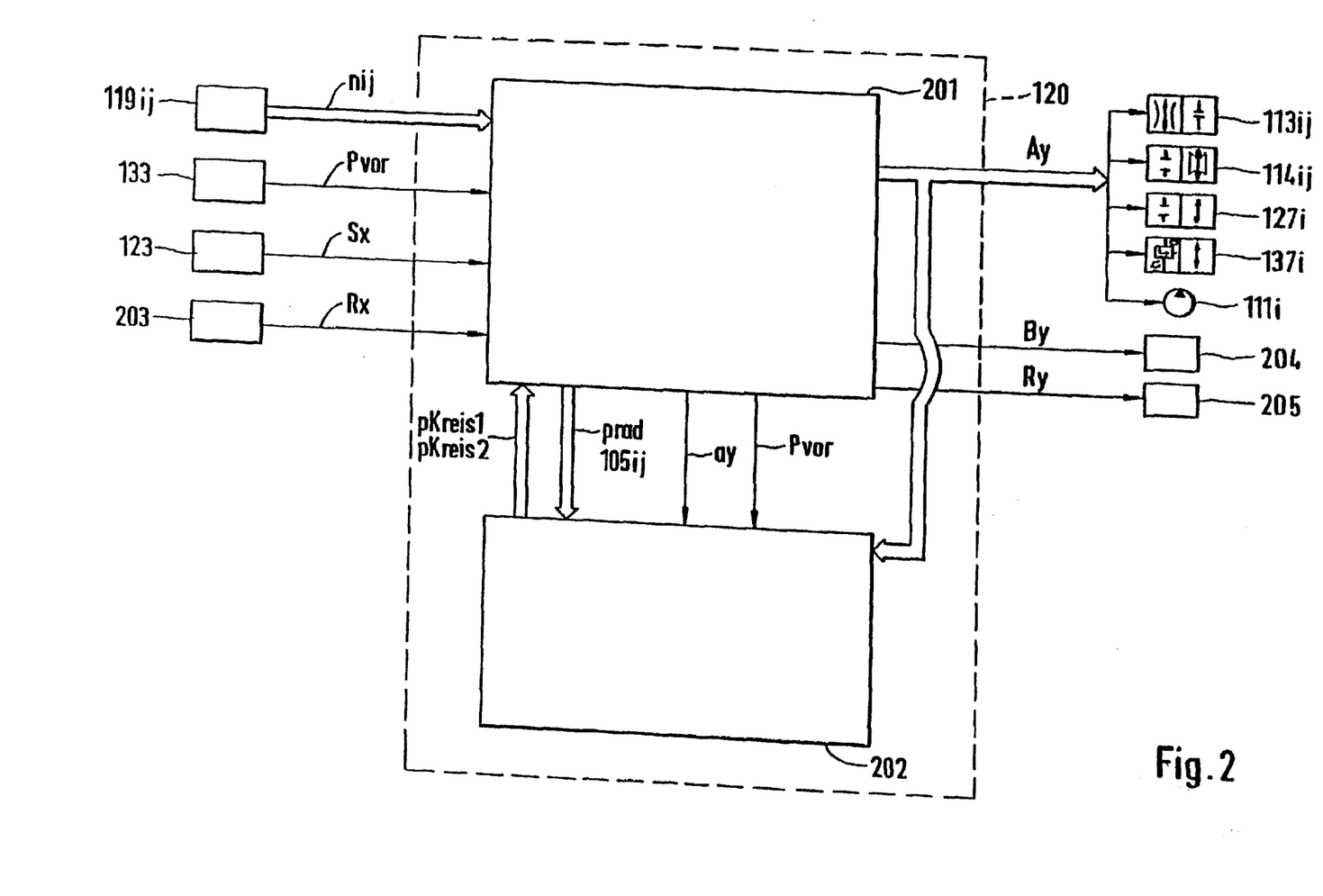
FIG. 2 a control unit.

FIG. 2 shows a detailed representation of control unit 120. Control unit 120 has a block 201, which represents a controller core of the traction-control system implemented in the vehicle. This controller core 201 is fed wheel speeds nij determined using wheel-speed sensors 119$ij$. In addition, controller core 210 receives signal Pvor, which is ascertained by sensor 133 and which represents the brake pressure set by the driver. As already indicated in FIG. 1, controller core 201 is fed further signals Sx, which are generated by other sensors present in the vehicle and indicated by block 123. It is intended that these other sensors include at least one sensor that records the transversal acceleration acting on the vehicle. To the extent that the control system implemented in the vehicle is a system for controlling a value that describes the vehicle dynamics, in particular the yaw rate, block 123 represents at least a steering-angle sensor, a yaw-rate sensor, and/or the already mentioned transversal-acceleration sensor.

Also represented in block 203 are other control systems or controllers contained in the vehicle. Signals Rx generated using these control systems or controllers are likewise fed to controller core 201. Signals nij, Pvor, Sx, and Rx, respectively, are denoted in FIG. 1 by reference numeral 122.

In addition, control unit 120 has a brake-pressure calculator 202, in which a quantity pcircuit1 representing the brake-circuit pressure is ascertained for brake circuit 108, and a quantity pcircuit2 representing the brake-circuit pressure is ascertained for brake circuit 107. Both the value for brake-circuit pressure pcircuit1, as well as the value for brake-circuit pressure pcircuit2 are supplied from brake-pressure calculator 202 to controller core 201. To determine the brake-circuit pressures pcircuit1 and pcircuit2, respectively, at least values prad105$ij$, which describe the pressure prevailing in the wheel-brake cylinder in question, are supplied from controller core 201 to brake-pressure calculator 202. In addition, from controller core 201, block 202 receives a signal ay describing the transversal acceleration acting on the vehicle, a signal Pvor describing the pressure set by the driver, as well as drive signals Ay, which are used to drive the valves and/or pumps contained in the brake system. Depending on the traction-control system implemented in the vehicle, controller core 201 generates, as a function of the input signals supplied to it, drive signals Ay, which are used to drive at least intake valves 113$ij$, exhaust valves 114$ij$, precharging valves 127$i$, switch-over valves 137$i$ contained in the brake system, as well as return pumps 111$i$. In addition, controller core 201 generates further drive signals By, which are used, for example, to drive pump unit 135 contained in the brake system, as well as other components mounted in the vehicle, which are combined in block 204. Moreover, controller core 201 generates signals Ry, which are fed to other controllers contained in the vehicle and indicated by block 205. Blocks 203 and 205, respectively, may contain either the same or different controllers.

Flow charts exemplifying calculation of brake-circuit pressures pcircuit1 and pcircuit2, respectively, may be inferred from FIGS. 3 through 8 of German laid open print DE 197 12 889 A1. Operations of this kind are able to be implemented or are implemented on brake-pressure calculator 202. Surprisingly, it turns out that the braking performance of a vehicle may be improved when brake pressure pcircuit1 and pcircuit2, respectively, are corrected by a correction factor, the correction factor being generated by a characteristic curve having a substantially continuous, first derivative between the correction factor and the transversal acceleration of the vehicle, and/or the correction factor being generated by a characteristic curve which is between the correction factor and the transversal acceleration of the vehicle and whose range includes an ascent that is dependent upon the vehicle's transversal acceleration. Such a characteristic curve is implemented, for example, by a functional sequence in accordance with FIG. 3, which is implemented or may be implemented, for its part, on brake-pressure calculator 202. In the flow chart according to FIG. 2, the correction factor is denoted by AyEpsRed and corresponds, for example, in the context of an implementation of a brake-pressure calculation in accordance with German laid open print DE 197 12 889 A1, to correction factor ekorrlb in FIG. 5b of German laid open print DE 197 12 889 A1. The functional sequence according to FIG. 3 begins (following start 301) with a query 302, as to whether ayMaximum<P_AyLiftoffMin P_AyLiftoffMin being a minimal transversal acceleration, whose value is set, for example, to 1.0 m/s$^2$, and ayMaximum being a variable, which is elucidated in FIG. 5.
If the condition ayMaximum<P_AyLiftoffMin is fulfilled, then correction factor AyEpsRed is set to equal 1.0 in a step 303. The operation is subsequently ended (end 304).
If the condition ayMaximum<P_AyLiftoffMin is not fulfilled, on the other hand, then a query 305 follows, as to whether ayMaximum>P_AyLiftoff P_AyLiftoff being a value for a transversal acceleration, which, due to the pushing of the pistons into the wheel cylinders, maximally influences the brake circuit (e.g., 5 m/s$^2$). The value of P_AyLiftoff corresponds, for example, to one sixteenth of the transversal acceleration at which the wheels would lift off.
If the condition ayMaximum>P_AyLiftoff is fulfilled, then correction factor AyEpsRed is set to equal P_AyEpsRedKx in a step 305. The operation is subsequently ended (end 304).
If the condition ayMaximum>P_AyLiftoff is not fulfilled, on the other hand, then correction factor AyEpsRed is set to equal 1+linear ascent·(ayMaximum−P_AyLiftoffMin)in a step 306, it holding that linear ascent=(1.0−P_AyEpsRedKx)/(P_AyLiftoffMin−P_AyLiftoff), P_AyEpsRedKx being a factor, which expresses this maximal influence on brake circuit x as a reduction in the compressibility of the brake medium, a typical value being, for example, 0.5. Query 307 is followed by step 306, as to whether ayMaximum<ayMean.

In this context, ayMean=(P_AyLiftoffMin+P_AyLiftoff)/2

Figure 3:
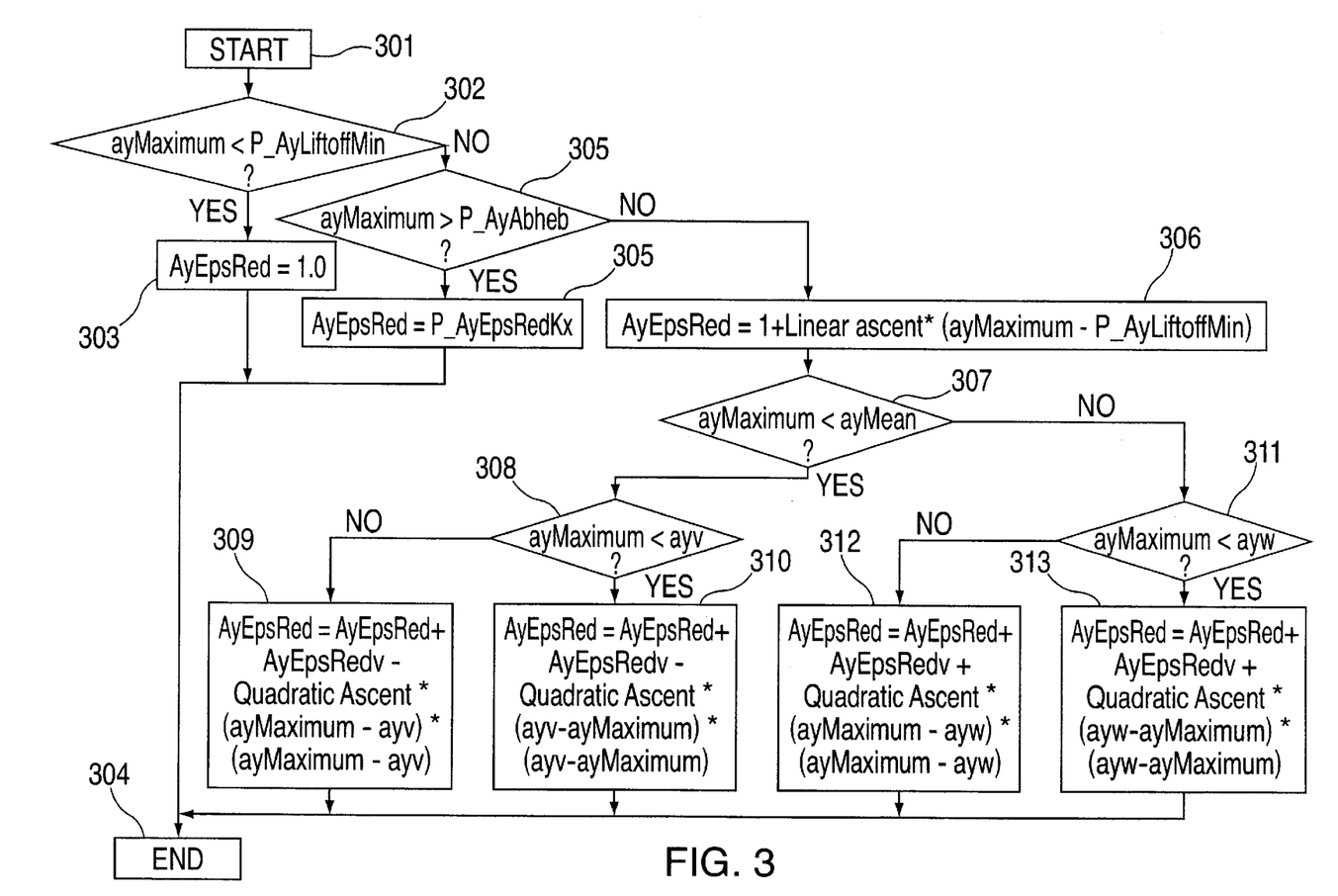
FIG. 3 an advantageous implementation of a characteristic curve.

If the condition ayMaximum<ayMean is fulfilled, then a query 308 follows as to whether ayMaximum<ayv.

In this context, ayv=P_AyLiftoffMin+(P_AyLiftoff−P_AyLiftoffMin)/4.
If the condition aymaximum<ayv is fulfilled, then the correction factor AyEpsRed is set to equal AyEpsRed+AyEpsRedv−quadratic ascent·(ayv−ayMaximum)$^2$ in a step 310, it holding that:

quadratic ascent=AyEpsRedv/((ayv−P_AyLiftoffMin)·(ayv−P_AyLiftoffMin))

The operation is subsequently ended (end 304).
If, on the other hand, the condition ayMaximum<ayv is not fulfilled, then correction factor AyEpsRed is set to equal AyEpsRed+AyEpsRedv−quadratic ascent·(ayMaximum−ayv)$^2$ in a step 309.

The operation is subsequently ended (end 304).
If the condition ayMaximum<ayMean is not fulfilled, then a query 311 follows as to whether ayMaximum<ayv.

In this context, ayw=P_AyLiftoff−(P_AyLiftoff−P_AyLiftoffMin)/4.

If the condition ayMaximum<ayw is fulfilled, then correction factor AyEpsRed is set to equal AyEpsRed+AyEpsRedv−quadratic ascent·(ayv−ayMaximum)$^2$ in a step 313. The operation is subsequently ended (end 304). If, on the other hand, the condition ayMaximum<ayw is not fulfilled, then correction factor AyEpsRed is set to equal AyEpsRed+AyEpsRedv−quadratic ascent·(ayMaximum−ayv)$^2$ in a step 312. The operation is subsequently ended (end 304).

At the beginning of the operation in accordance with FIG. 3, one may optionally insert a query which is used to interrogate whether disk brakes are provided at all (in contrast to drum brakes) in the designated brake circuit. In accordance with such a query, the operation would be ended when no disk brakes are at hand.

Figure 4:
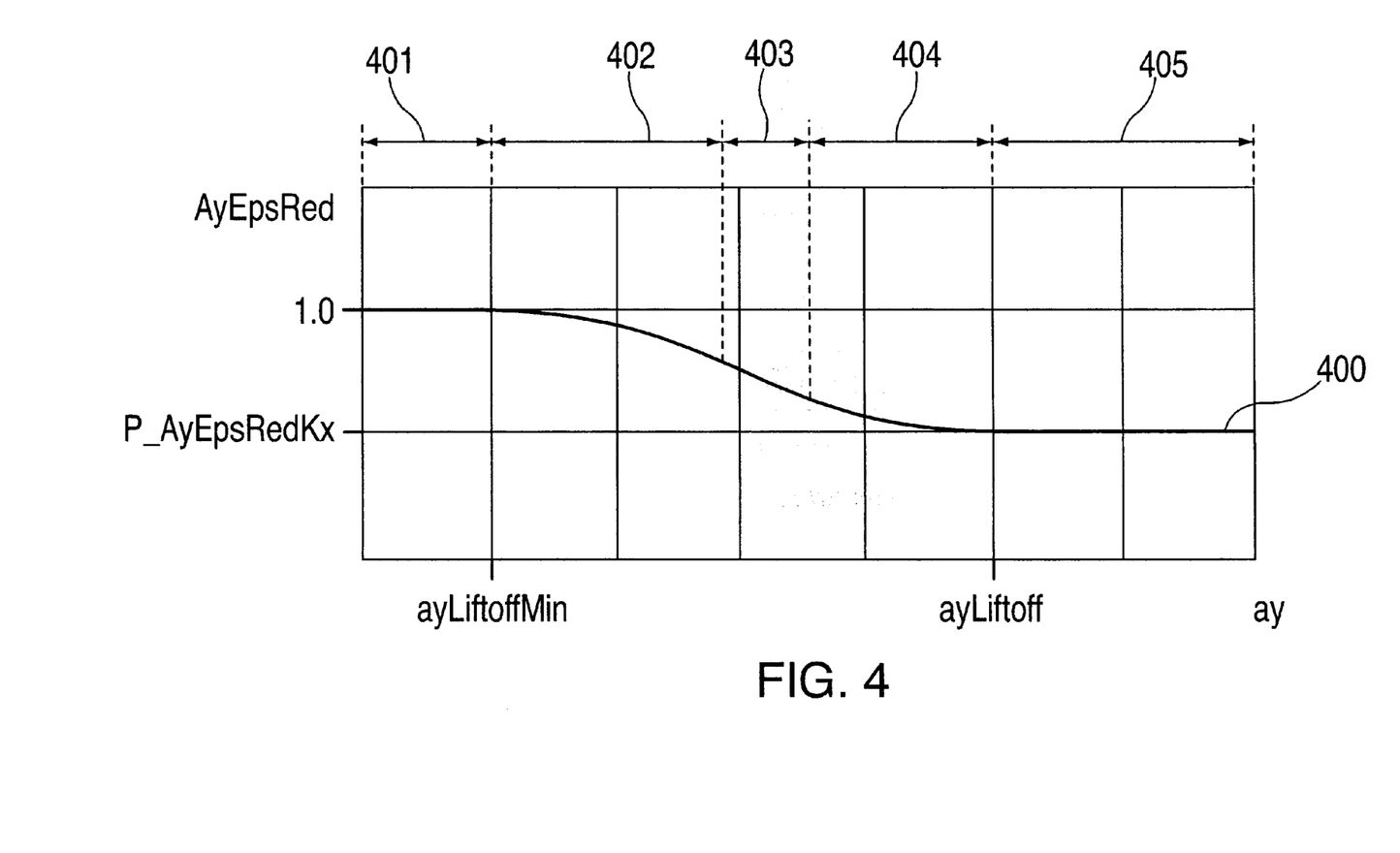
FIG. 4 an advantageous characteristic curve.

FIG. 4 shows a characteristic curve 400 between transversal acceleration ay and correction factor AyEpsRed that is attainable using the flow chart according to FIG. 3. Such a characteristic is, of course, not limited by the flow chart according to FIG. 3, but may also be stored as a function, a table, or as a neural network. To store characteristic curve 400, i.e., to store variables from which characteristic curve 400 is produced, e.g., in accordance with a flow chart of FIG. 3, a memory (not shown) is provided on control unit 120.

The characteristic curve shown in FIG. 4 has a first range 401 and a second range 405, including a correction factor AyEpsRed that is independent of transversal acceleration ay. Between first range 401 and second range 405, characteristic curve 400 has a third range 403, including a correction factor AyEpsRed that is linearly dependent upon transversal acceleration ay. Between first range 401 and third range 403, as well as second range 405 and third range 403, characteristic curve 400 has one range 402 and 404 each, in which correction factor AyEpsRed is dependent upon the square of transversal acceleration ay.

Figure 5:
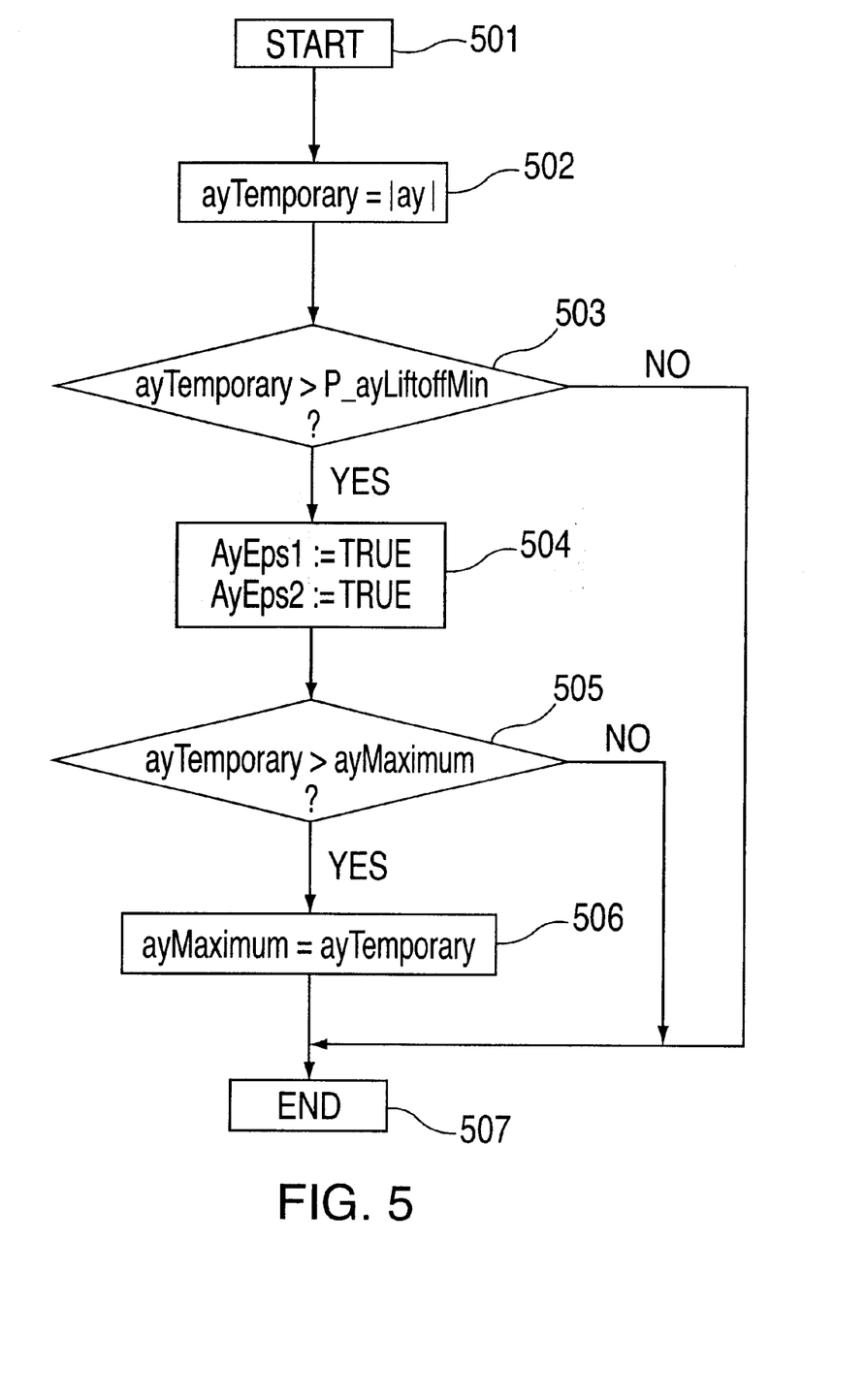
FIG. 5 a flow chart for calculating the variables ayMaximum.

FIG. 5 depicts an operational sequence for calculating variables ayMaximum which is implemented or may be implemented on brake-pressure calculator 202. In this context, following start 501, in a step 502, a variable ayTemporary is initially set to equal the amount of the vehicle's transversal acceleration ay. A query 503 follows as to whether it holds for an auxiliary variable aytemperorary that:

ayTemporary>P_AyLiftoffMin,

If the condition ayTemporary>P_AyLiftoffMin is not fulfilled, the operation is ended (end 507).
If, on the other hand, the condition ayTemporary>P_AyLiftoffMin is fulfilled, then a step 504 follows, in which two variables
AyEps1:=TRUE
AyEps2:=TRUE
are set. Variables AyEps1 and AyEps2 fulfill measuring purposes; they indicate that the algorithm is active.
Step 504 is followed by query 505 ayTemporary>ayMaximum

If the condition ayTemporary>aymaximum is not fulfilled, the operation is ended (end 507).
If the condition ayTemporary>ayMaximum is fulfilled, on the other hand, then a step follows in which ayMaximum=ayTemporary.

The operation is subsequently ended (end 507).

Figure 6:
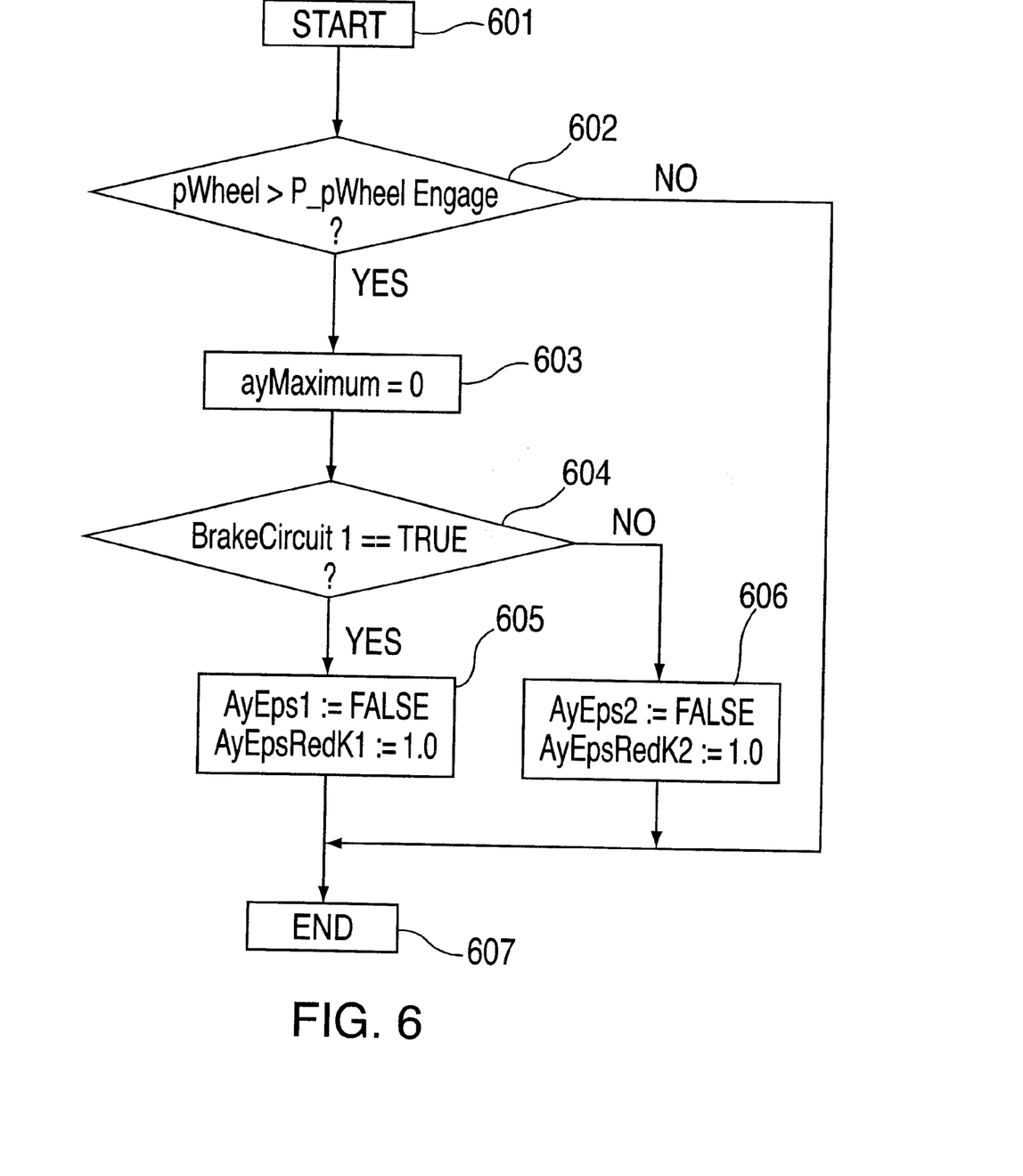
FIG. 6 a flow chart for resetting the logic.

FIG. 6 depicts an operational sequence for resetting correction factor AyEpsRed which is implemented or may be implemented on brake-pressure calculator 202. A program that implements this flow chart advantageously proceeds in accordance with a flow chart that implements the flow chart according to FIG. 3. The flow chart according to FIG. 6 has the effect that value aymaximum is a value of a maximal transversal acceleration, which, however, is interpreted to mean that a correction factor AyEpsRed calculated on the basis of this value does not exceed a predefined maximal value, this maximal value corresponding to the minimally possible compressibility in the brake circuit. Start 601 of the sequence is followed by AyEpsRed, a query 602 as to whether pWheel>P_pWheelEngage, pWheel being an estimated value for the wheel-brake cylinder pressure and P_pWheelEngage being an estimated value for the wheel-brake cylinder pressure, at which the brake piston engages on the brake disk.
If the condition pWheel>P_pWheelEngage is not fulfilled, then the sequence is ended (end 607). If, on the other hand, condition pWheel>P_pWheelEngage is fulfilled, then, in a step 603, ayMaximum=0 is set. A query follows as to whether brake circuit I is processed (BRAKECIRCUIT1:=TRUE). If brake circuit I is processed, then, in a step 605, AyEps1:=FALSE and AyEpsRedK1=1.0 are set, AyEpsRedK1 being correction value AyEpsRed for brake circuit I. If, on the other hand, brake circuit II is processed, then, in a step 606, AyEps2:=FALSE and AyEpsRedK1=1.0 are set, AyEpsRedK2 being correction value AyEpsRed for brake circuit II. Following step 605 or step 606, the sequence is ended (end 607).

What is claimed is:

1. A method for operating a brake system (100) for a vehicle, the brake system (100) being used to adjust a braking pressure that is dependent upon a correction factor (AyEpsRed), the correction factor (AyEpsRed) being produced by a characteristic curve (400) relating the correction factor (AyEpsRed) and the transversal acceleration (ay) of the vehicle, wherein the first derivative of the characteristic curve (400) relating the correction factor (AyEpsRed) and the transversal acceleration (ay) of the vehicle is continuous.

2. The method as recited in claim 1, wherein the characteristic curve has a first range (401) and a second range (405), including a correction factor (AyEpsRed) that is independent of the trasversal acceleration (ay) of the vehicle.

3. The method as recited in claim 2, wherein between the first range (401) and the second range (405), the characteristic curve (400) has a third range (403) including a correction factor (AyEpsRed) that is dependent upon the transversal acceleration (ay) of the vehicle.

4. The method as recited in claim 3, wherein between the first range (401) and the third range (403), the characteristic curve (400) has a range (402) including an ascent that is dependent upon the transversal acceleration (ay) of the vehicle.

5. The method as recited in claim 3, wherein between the second range (405) and the third range, the characteristic curve (400) has a range (404) including an ascent that is dependent upon the transversal acceleration (ay) of the vehicle.

6. A brake system (100) for a vehicle, in particular a brake system (100) that is operable in accordance with a method as recited in claim 1, the brake system (100) being used to adjust a braking pressure that is dependent upon a correction factor (AyEpsRed), the brake system (100) having a memory including a characteristic curve (400) relating the correction factor (AyEpsRed) and the transversal acceleration (ay) of the vehicle, wherein the first derivative of the characteristic curve (400) relating the correction factor (AyEpsRed) and the transversal acceleration (ay) of the vehicle is continuous.

7. A method for operating a brake system (100) for a vehicle, the brake system (100) being used to adjust a braking pressure that is dependent upon a correction factor (AyEpsRed), the correction factor (AyEpsRed) being produced by a characteristic curve (400) relating the correction factor (AyEpsRed) and the transversal acceleration (ay) of the vehicle, wherein the characteristic curve (400) relating the correction factor (AyEpsRed) and the transversal acceleration (ay) of the vehicle has at least one range (402, 404) that includes an ascent that is dependent upon the vehicle's transversal acceleration (ay).

8. The method as recited in claim 7, wherein the first derivative of the characteristic curve (400) relating the correction factor (AyEpsRed) and the transversal acceleration (ay) of the vehicle is continuous.

9. A brake system (100) for a vehicle, in particular a brake system (100) that is operable in accordance with a method as recited in claim 7, the brake system (100) being used to adjust a braking pressure that is dependent upon a correction factor (AyEpsRed), the brake system (100) having a memory including a characteristic curve (400) relating the correction factor (AyEpsRed) and the transversal acceleration (ay) of the vehicle, wherein the characteristic curve (400) relating the correction factor (AyEpsRed) and the transversal acceleration (ay) of the vehicle has at least one range (402, 404) that includes an ascent that is dependent upon the vehicle's transversal acceleration (ay).

10. A control unit (120) for a brake system (100) for a vehicle, in particular a brake system (100) that is operable in accordance with a method as recited in claim 7, the control unit (120) being used to generate manipulated variables, which are dependent upon a correction factor (AyEpsRed), for the brake system (100) to adjust a braking pressure, the control unit (120) having a memory including a characteristic curve (400) relating the correction factor (AyEpsRed) and the transversal acceleration (ay) of the vehicle, wherein the characteristic curve (400) relating the correction factor (AyEpsRed) and the transversal acceleration (ay) of the vehicle has at least one range (402, 404) that includes an ascent that is dependent upon the vehicle's transversal acceleration (ay).

11. A method for operating a brake system for a vehicle, comprising:

produce a correction factor in accordance with a characteristic curve that relates the correction factor and a transversal acceleration of the vehicle; and adjusting a braking pressure dependent upon the correction factor;

wherein a first derivative of the characteristic curve is continuous.

12. The method according to claim 11, wherein the characteristic curve includes a first range and a second range including a correction factor independent of the transversal acceleration.

13. The method according to claim 12, wherein the characteristic curve includes a third range, between the first range and the second range, including a correction factor dependent upon the transversal acceleration of the vehicle.

14. The method according to claim 13, wherein the characteristic curve includes a fourth range, between the first range and the third range, including an ascent dependent upon the transversal acceleration of the vehicle.

15. The method according to claim 14, wherein the characteristic curve includes a fifth range, between the second range and the third range, including an ascent dependent upon the transversal acceleration of the vehicle.

16. The method according to claim 13, wherein the characteristic curve includes a fourth range, between the second range and the third range, including an ascent dependent upon the transversal acceleration of the vehicle.

17. A method for operating a brake system for a vehicle, comprising:

producing a correction factor in accordance with a characteristic curve that relates the correction factor and a transversal acceleration of the vehicle; and adjusting a braking pressure dependent upon the correction factor;

wherein the characteristic curve includes at least one range that includes an ascent dependent upon the transversal acceleration.

18. The method according to claim 17, wherein the characteristic curve includes a first range and a second range including a correction factor independent of the transversal acceleration.

19. The method according to claim 18, wherein the characteristic curve includes a third range, between the first range and the second range, including a correction factor dependent upon the transversal acceleration of the vehicle.

20. The method according to claim 19, wherein the characteristic curve includes a fourth range, between the first range and the third range, including an ascent dependent upon the transversal acceleration of the vehicle.

21. The method according to claim 20, wherein the characteristic curve includes a fifth range, between the second range and the third range, including an ascent dependent upon the transversal acceleration of the vehicle.

22. The method according to claim 19, wherein the characteristic curve includes a fourth range, between the second range and the third range, including an ascent dependent upon the transversal acceleration of the vehicle.

23. The method according to claim 17, wherein a first derivative of the characteristic curve is continuous.

24. A brake system for a vehicle, comprising:

a memory including a characteristic curve that relates a correction factor to a transversal acceleration of the vehicle; and an arrangement configured to adjust a braking pressure dependent upon the correction factor;

wherein a first derivative of the characteristic curve is continuous.

25. A brake system for a vehicle, comprising:

a memory including a characteristic curve that relates a correction factor and a transversal acceleration of the vehicle; and an arrangement configured to adjust a braking pressure dependent upon the correction factor;

wherein the characteristic curve includes an ascent dependent upon the transversal acceleration.

26. A control unit for a brake system for a vehicle, comprising:

a memory including a characteristic curve that relates a correction factor and a transversal acceleration of the vehicle; and an arrangement configured to generate manipulated variables dependent upon the correction factor for the brake system to adjust a braking pressure;

wherein the characteristic curve includes at least one range including an ascent dependent upon the transversal acceleration.

* * * * *